United States Patent [19]

Uchimaru et al.

[11] Patent Number: 5,721,723
[45] Date of Patent: Feb. 24, 1998

[54] OBJECTIVE LENS DRIVING DEVICE, DATA RECORDING DEVICE, AND DATA REPRODUCING DEVICE, ALL HAVING DRIVER FORCE SELECTIVELY 120 TUTINE AND POSITIONING THE OBJECTIVE LENSES

[75] Inventors: Kiyotaka Uchimaru, Tokyo; Akihiro Kasahara, Chiba-ken; Koichi Nagai, Kawasaki; Naomasa Takahashi, Tokyo, all of Japan

[73] Assignee: Kabushiki Kaisha Toshiba, Kawasaki, Japan

[21] Appl. No.: 559,370

[22] Filed: Nov. 16, 1995

[30] Foreign Application Priority Data

Nov. 18, 1994 [JP] Japan ........................... 6-283907

[51] Int. Cl.$^6$ ........................................ G11B 7/085
[52] U.S. Cl. ........................ 369/219; 369/44.15
[58] Field of Search ............................ 369/112, 219, 369/44.15, 44.16, 244; 359/813, 814, 823, 824

[56] References Cited

U.S. PATENT DOCUMENTS

| | | | |
|---|---|---|---|
| 4,759,005 | 7/1988 | Kasahara | 369/44 |
| 4,766,584 | 8/1988 | Sekimoto et al. | 369/44.15 |
| 5,235,581 | 8/1993 | Miyagawa et al. | 369/44.12 |
| 5,381,273 | 1/1995 | Goda | 369/44.15 |
| 5,444,684 | 8/1995 | Yanagi et al. | 369/44.28 |

FOREIGN PATENT DOCUMENTS

| | | | |
|---|---|---|---|
| 176332 | 4/1986 | European Pat. Off. | 369/44.15 |
| 60-140549 | 7/1985 | Japan . | |
| 3-141035 | 6/1991 | Japan | 369/244 |
| 3-203031 | 9/1991 | Japan | 369/244 |
| 4-181525 | 6/1992 | Japan | 369/44.15 |
| 4-205821 | 7/1992 | Japan | 369/44.15 |
| 5-81697 | 4/1993 | Japan | 369/44.15 |
| 628692 | 2/1994 | Japan | 369/44.15 |

*Primary Examiner*—Stuart S. Levy
*Assistant Examiner*—Brian E. Miller
*Attorney, Agent, or Firm*—Oblon, Spivak, McClelland, Maier & Neustadt, P.C.

[57] ABSTRACT

An optical disk drive which is a data recording device or a data reproducing device having two movable members. The first movable member has two objective lenses on it. A magnetic circuit is secured to the second movable member to apply a magnetic field to the tracking coil attached to the first movable member. The first and second movable members can rotate around a shaft. The first objective lens or the second objective lens is selected and used in accordance with the type of the disk used. The device can therefore record data on or reproduce data from disk of different types. Further, since the angle at which the second movable member is inclined to the shaft remains unchanged, the device can record data on or reproduce data from a disk, without causing coma-aberration or the like, no matter whether the first object lens or the second objective lens is selected and used.

34 Claims, 7 Drawing Sheets

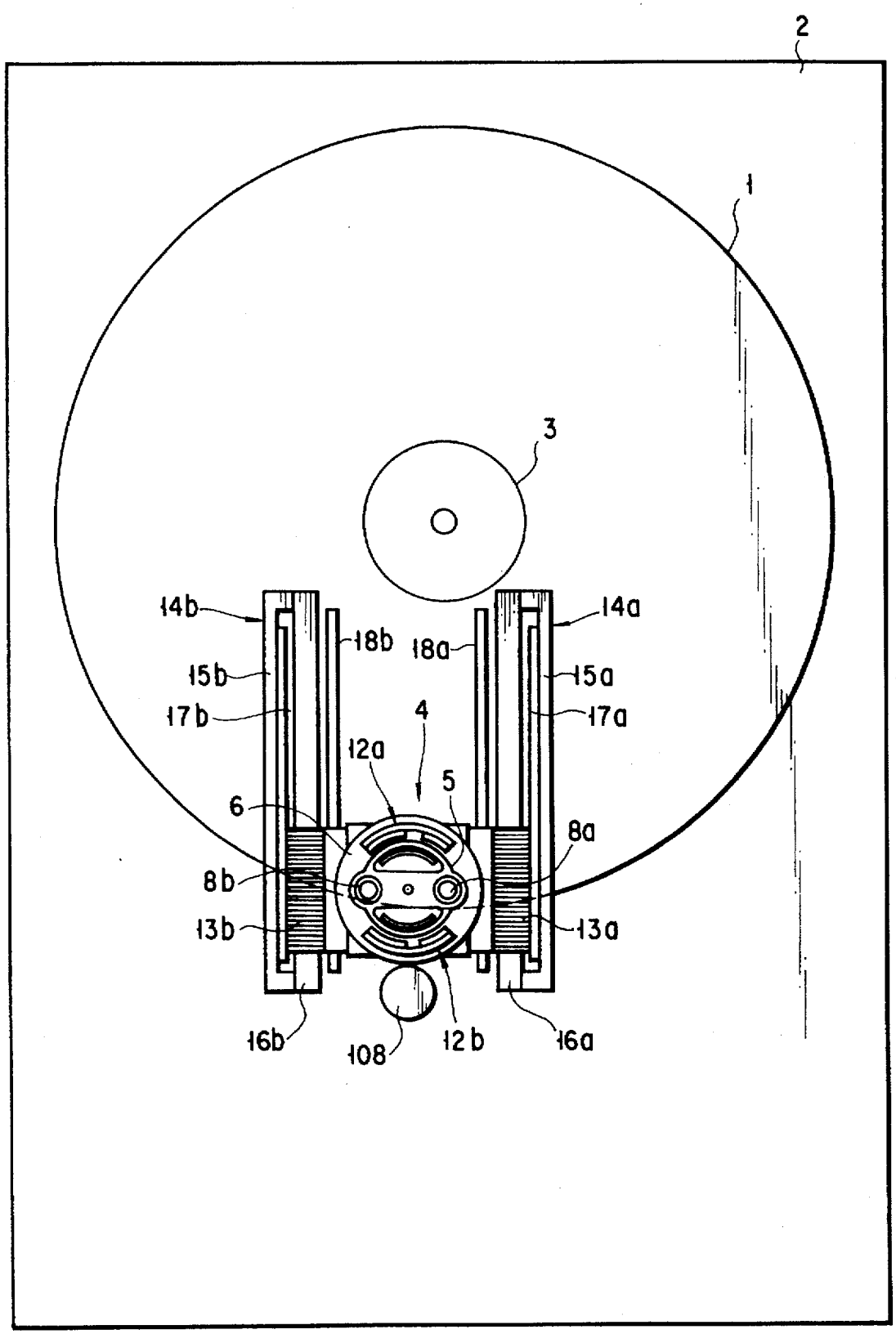
F I G. 1

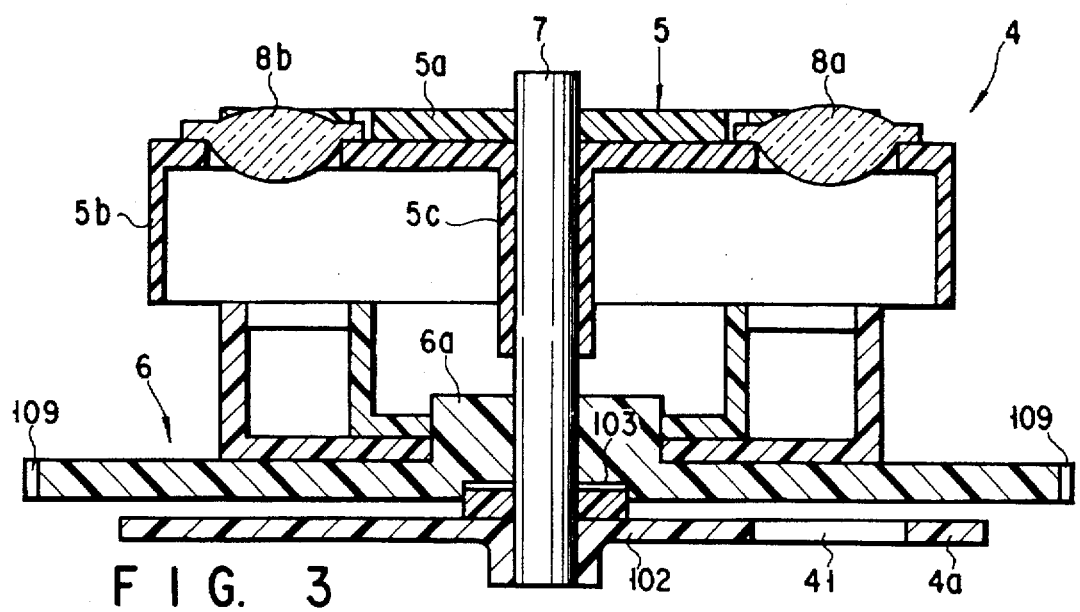
F I G. 3
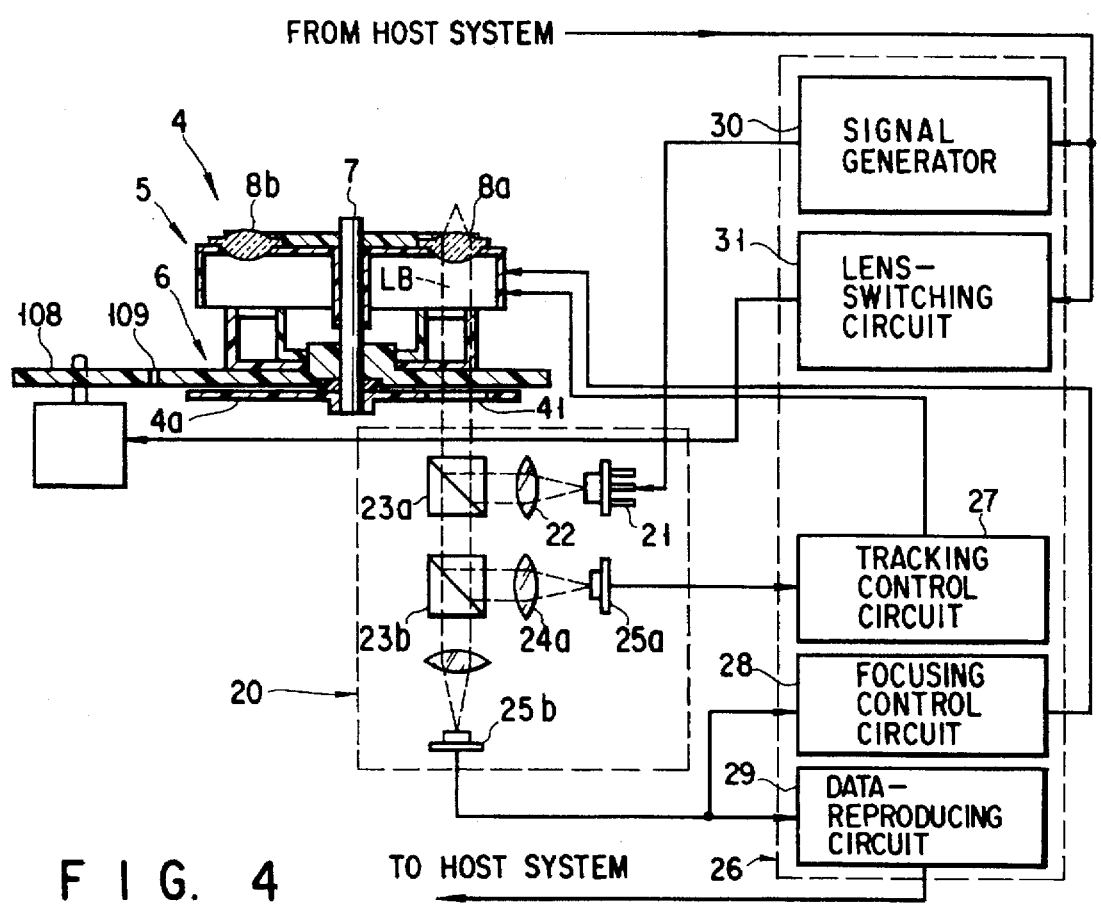
F I G. 4

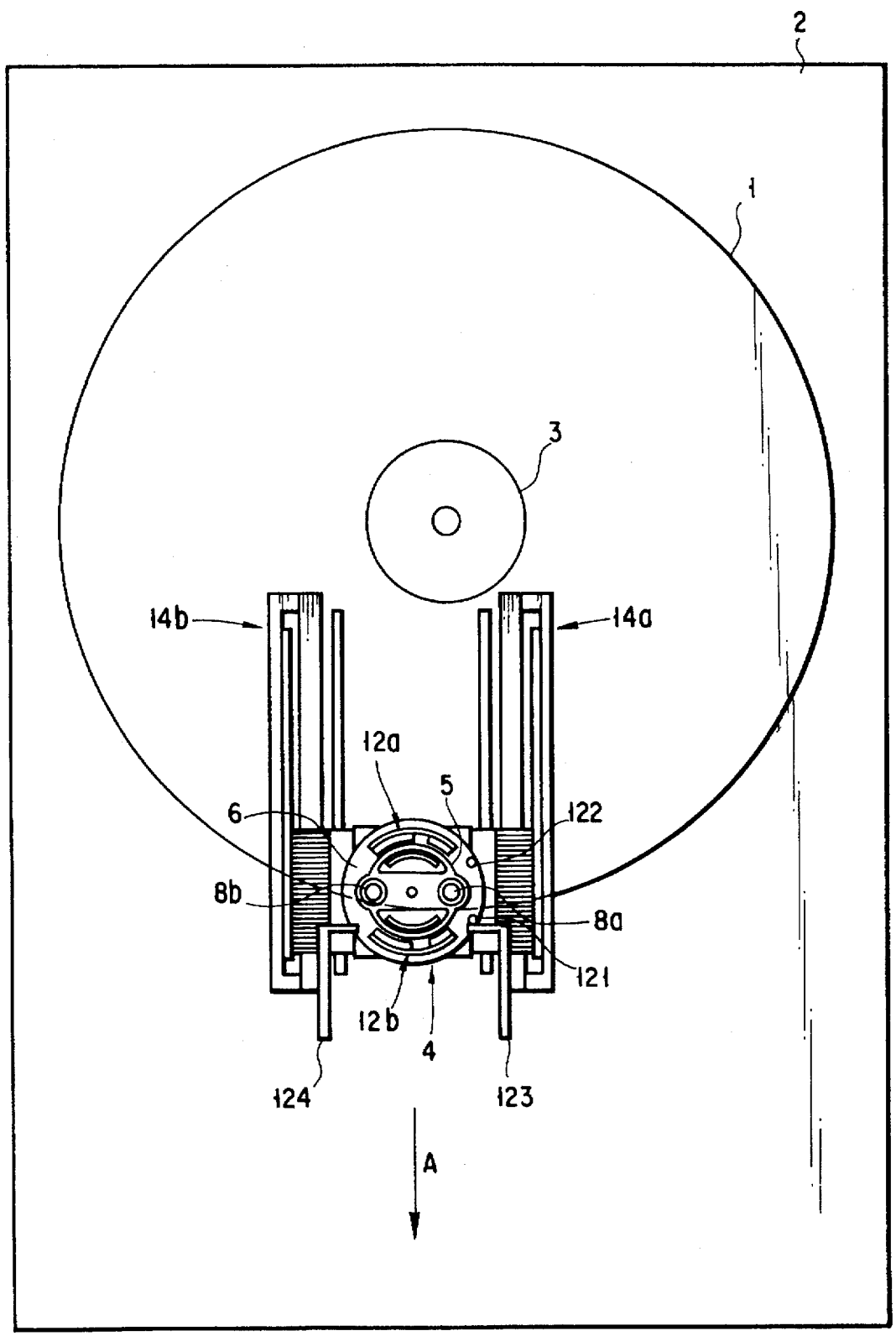
F I G. 5

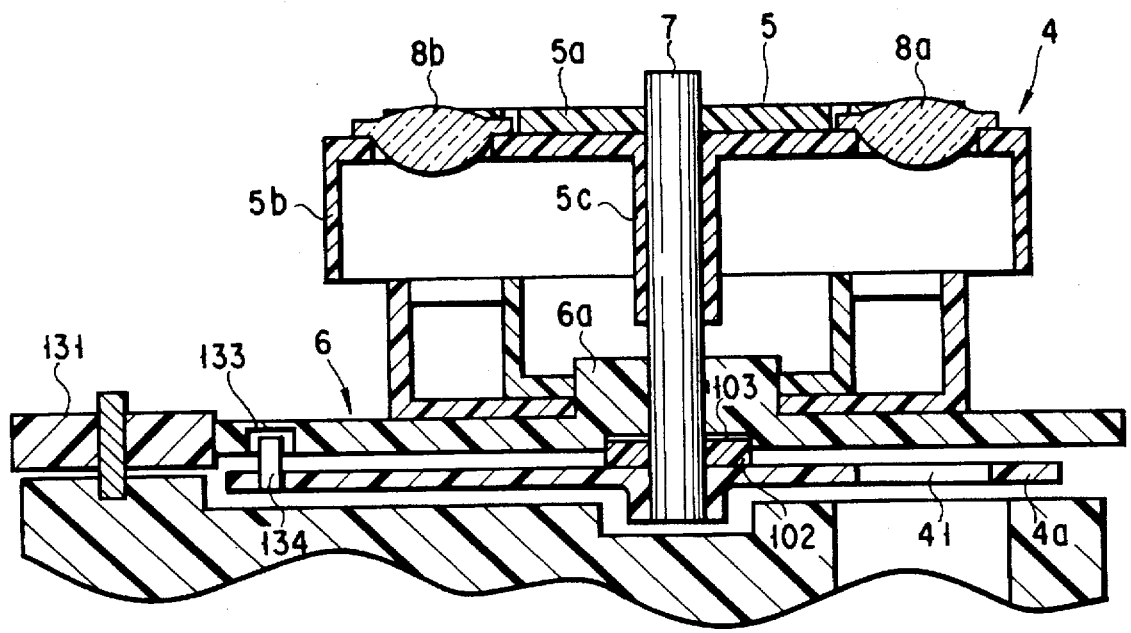
F I G. 7
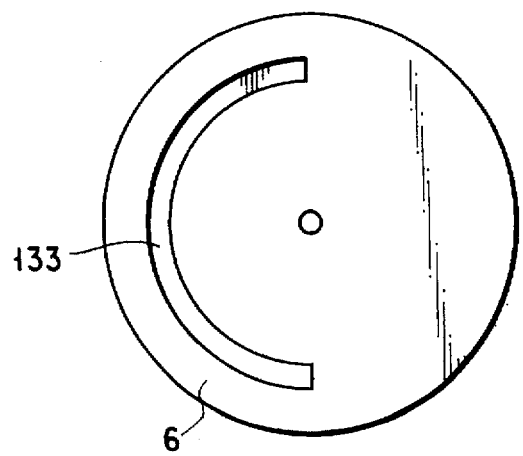
F I G. 8

OBJECTIVE LENS DRIVING DEVICE, DATA RECORDING DEVICE, AND DATA REPRODUCING DEVICE, ALL HAVING DRIVER FORCE SELECTIVELY 120 TUTINE AND POSITIONING THE OBJECTIVE LENSES

BACKGROUND OF THE INVENTION

1. Field of the Invention

The present invention relates to an objective lens driving device, a data recording device, and a data reproducing device.

2. Description of the Related Art

In recent years, optical data recording media, such as optical disks and optomagnetic disks, have been developed. Simultaneously, objective lens driving devices have been developed for use in combination with optical data recording media. The objective lens driving devices are now in commonly use to reproduce optical data from CD-ROMs such as compact disks (CDs) and laser disks (LDs).

Very recently, a new type of an objective lens driving device has been developed, which can record data on or reproduce data from an optical data recording medium of MO (Magnet-Optical) or PC (Phase-Change) recording type.

Generally, optical disks and optomagnetic disks are standardized in terms of data-recording format. It is expected that their recording densities will increase gradually. More precisely, pits holding units of data (i.e., bits), will probably have their size reduced to a value of sub-micron order, from the present value of one micron. Disk drives are designed so as to form sub-micron pits in the surface of an optical or optomagnetic disk. For instance, a disk drive comprises a laser which emits a short-wavelength beam and an objective lens which has an increased NA (Number of Aperture), whereby a laser beam of a decreased diameter is be applied into the disk.

New-standard disks which differ in thickness from the conventional ones have been developed. So has been a new type of a disk drive which can record data on or reproduce data from a new-standard disk. Here arises a problem. The disk drive of the new type may be able to neither record data on nor reproduce data from the conventional-standard disk. In order to record data on or reproduce data from the new-standard disk, at least two disk drives must be used—a conventional disk drive for recording data on or reproducing data from the conventional disk, and the new-type disk drive for recording data on or reproducing data from the new-standard disk.

Accordingly it is demanded that a disk drive be provided which can record data on or reproduce data from the new-standard optical or optomagnetic disk and the conventional optical or optomagnetic disk, as well.

SUMMARY OF THE INVENTION

An object of the present invention is to provide an objective lens driving device, a data recording device, and a data reproducing device, which can record data on or reproduce data from optical or optomagnetic disks which differ in standards and characteristics.

Another object of the present invention is to provide an objective lens driving device, a data recording device, and a data reproducing device, which can record data on or reproduce data from an optical or optomagnetic disk, without causing coma-aberration or the like.

Still another object of the present invention is to provide an objective lens driving device, a data recording device, and a data reproducing device, which can record data on or reproduce data from an optical or optomagnetic disk, without the risk of cutting the lead wires used.

According to a first aspect of the present invention, there is provided an objective lens driving device comprising a carriage movable along an optical data recording medium; a shaft mounted on the carriage; a first movable member rotatable around the shaft; a plurality of objective lenses mounted on the first movable member and having different optical characteristics; a second movable member rotatable around the shaft; and a driver for rotating and positioning the first and second movable members such that a light beam is applied to the optical data recording medium through a desired one of the objective lenses.

It is preferable that a ferromagnetic member is attached to the first movable member and that a magnet be secured to the second movable member to attract the ferromagnetic movable member.

It is also preferable that a coil is connected to the first movable member to supply a current for controlling the first movable member. Preferably, lead wires extend from the first movable member, are held to the second movable member and are led outside the device, to supply the current to the coil.

Further, it is preferable that the first movable member is positioned to have its center of gravity located on the shaft.

It is also preferable that the carriage is able to move to a position outside the optical data recording medium. In case of moving the carriage so, the driver should comprise a driving gear and an electric motor. The driving gear comes into mesh with the second movable member reaches the position, and the motor is provided to rotate the driving gear. Alternatively, for the same purpose, the driver must have a lever which abuts on the second movable member to rotate the second movable member as the carriage moves to that position.

Furthermore it is preferable that the carriage has an intermediate gear which comes into mesh with the second movable member. In this case, the driver has a driving gear and an electric motor. The driving gear comes into mesh with the second movable member moves to a position outside the optical data recording medium, and the motor is provided to rotate the driving gear. Alternatively, the driver must have a lever which abuts on the second movable member to rotate the intermediate gear as the carriage moves to that position.

According to a second aspect of the present invention, there is provided a data recording device comprising a carriage movable along an optical data recording medium; a shaft mounted on the carriage; a first movable member rotatable around the shaft; a plurality of objective lenses mounted on the first movable member and having different optical characteristics; a second movable member rotatable around the shaft; and a driver for rotating and positioning the first and second movable members such that data is recorded on the optical data recording medium by a desired one of the objective lenses.

According to a third aspect of the present invention, there is provided a data reproducing device comprising a carriage movable along an optical data recording medium; a shaft mounted on the carriage; a first movable member rotatable around the shaft; a plurality of objective lenses mounted on the first movable member and having different optical characteristics; a second movable member rotatable around the shaft; and a driver for rotating and positioning the first and second movable members such that data is reproduced from the optical data recording medium by a desired one of the objective lenses.

In the data recording device and the data reproducing device, it is preferable that a ferromagnetic member is attached to the first movable member and that a magnet be secured to the second movable member to attract the ferromagnetic member.

Also is it preferable that a coil is connected to the first movable member to supply a current for controlling the first movable member. Preferably, lead wires extend from the first movable member, are held to the second movable member and are led outside the device, to supply the current to the coil.

Moreover, it is preferable that the first movable member is positioned to have its center of gravity located on the shaft.

It is also preferable that the objective lenses have a different number of aperture each.

Further, it is preferable that the carriage is able to move to a position outside the optical data recording medium. In case of moving the carriage so, the driver should comprise a driving gear and an electric motor. The driving gear comes into mesh with the second movable member reaches the position, and the motor is provided to rotate the driving gear. Alternatively, for the same purpose, the driver must have a lever which abuts on the second movable member to rotate the second movable member as the carriage moves to that position.

In addition, it is preferable that the carriage has an intermediate gear which comes into mesh with the second movable member. In this case, the driver has a driving gear and an electric motor. The driving gear comes into mesh with the second movable member moves to a position outside the optical data recording medium, and the motor is provided to rotate the driving gear. Alternatively, the driver must have a lever which abuts on the second movable member to rotate the intermediate gear as the carriage moves to that position.

According to the present invention, one of the objective lenses (i.e., optical elements) of different characteristics is selected in accordance with the type of the data recording medium used (e.g., an optical disk or an optomagnetic disk). Equipped with two or more objective lenses, the device according to the present invention can record data on or reproduce data from optical or optomagnetic disks which differ in standards and characteristics. For example, it can record data on or reproduce data from not only the conventional disk, but also the new-standard disk.

The present invention is characterized in that a magnet (a part of a magnetic circuit) is attached to the second movable member, to rotate the first movable member holding the objective lenses and can be rotated around its axis. The angle at which the second movable member is inclined to the shaft therefore remains unchanged. The objective lenses have been so positioned that each has its optical axis aligned with a reference optical when it is moved to the specific position where it is used. Thus, whichever object lens is used, the device can record data on or reproduce data from an optical or optomagnetic disk, without causing coma-aberration or the like.

The distance between the first and second movable members remains unchanged even if the second movable member rotates. Hence, there is no risk that the lead wires are cut while the device is recording data on or reproducing data from an optical disk or an optomagnetic disk, provided that the lead wires extend from the first movable member, are held to the second movable member and are led outside the device.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 1 is a plan view of an optical disk drive which is a first embodiment of the present invention;

FIG. 3 is a sectional view of the objective lens driving device illustrated in FIG. 2;

FIG. 4 is a diagram showing the optical system and the signal-processing system, both incorporated in the optical disk drive of FIG. 1;

FIG. 5 is a plan view of an optical disk drive which is a second embodiment of the present invention;

FIG. 7 is a sectional view of the third embodiment, showing the second movable member set in mesh with the intermediate gear;

FIG. 8 is a plan view of the second movable member used in the third embodiment, illustrating the groove formed in the second movable member.

DETAILED DESCRIPTION OF THE PREFERRED EMBODIMENTS

Figure 2:
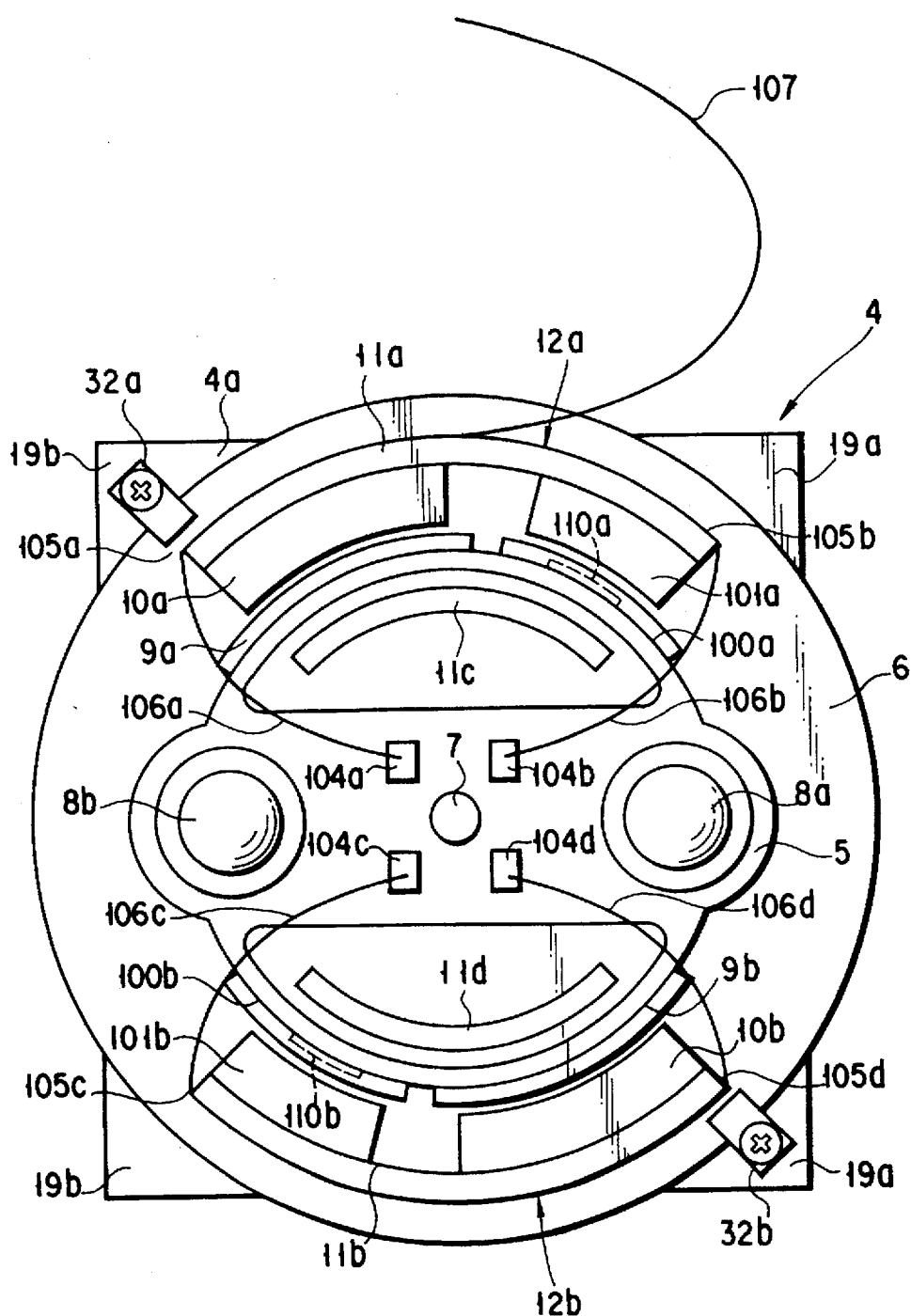
FIG. 2 is a plan view of the objective lens driving device incorporated in the optical disk drive shown in FIG. 1.

Preferred embodiments of the present invention will be described, with reference to the accompanying drawings.

First Embodiment

An optical disk drive, which is a data recording device or a data reproducing device according to the first embodiment of the present invention, will be described with reference to FIGS. 1 to 4.

As shown in FIG. 1, the optical disk drive comprises a base 2, a spindle motor 3, a carriage 4, two movable members 5 and 6, and a shaft 7. The spindle motor 3 is mounted on the base 2. A disk 1 (an optical disk or an optomagnetic disk) is fastened to the spindle motor 3 by a chucking means such as a magnet chuck (not shown). The spindle motor 3 rotates the disk 1 stably so that data may be recorded on or reproduced from the disk 1.

The carriage 4 is located below the disk 1. Both movable members 5 and 6 are mounted on the carriage 4. As will be described later, the first movable member 5 is supported to move in the radial and axial directions of the disk 1, whereas the second movable member 6 is supported to move in only the axial direction of the disk 1. Furthermore, both movable members 5 and 6 can rotate around their axes.

As shown in FIG. 3, the first movable member 5 comprises a blade 5a and a coil bobbin 5b. The disk-shaped blade 5a opposes one surface of the disk 1. The coil bobbin 5b is secured to the lower surface of the blade 5a. A sliding bearing 5c, which is a hollow cylinder, is formed integral with the bobbin 5b and coaxial therewith.

The carriage 4 has a fixed base 4a. The shaft 7 protrudes upwards from the upper surface of the fixed base 4a. The shaft 7 is loosely inserted in the sliding bearing 5c, with a clearance (10 microns or less) provided between it and the inner surface of the bearing 5c. The bearing 5c and the shaft 7 constitute a sliding mechanism, which allows the first movable member 5 not only to rotate around its axis but also to move along its axis.

The optical disk drive has a plurality of objective lens, more correctly two objective lenses 8a and 8b. The lenses 8a and 8b are mounted on the disc-shaped blade 5a and spaced apart from each other. They have different optical characteristics. More specifically, the first lens 8a has number of aperture (NA) of 0.45, whereas the second lens 8a has number of aperture (NA) of 0.6. The lenses 8a and 8b are positioned such that the unit consisting of the first movable member 5 and the objective lenses 8a and 8b has a center of gravity substantially aligned with the axis of the shaft 7. In other words, the objective lenses 8a and 8b make the first movable member 5 well balanced with respect to the shaft 7.

The optical disk drive further comprises two rectangular focusing coils 9a and 9b and two tracking coils 100a and 100b as illustrated in FIG. 2. The focusing coils 9a and 9b are bonded to the outer circumferential surface of the coil bobbin 5b, and so are two rectangular tracking coils 100a and 100b. The focusing coils 9a and 9b are positioned diametrically opposite. Similarly, the tracking coils 100a and 100b are positioned diametrically opposite.

The optical disk drive further has two magnetic circuits 12a and 12b, which are mounted on the second movable member 6. The circuits 12a and 12b are positioned diametrically opposite, with respect to the axis of the shaft 7. The first magnetic circuit 12a comprises two permanent magnets 10a and 101a and two yokes 11a and 11c. The second magnetic circuit 12b comprises two permanent magnets 10b and 101b and two yokes 11b and 11d. As seen from FIG. 2, the first focusing coil 9a is interposed between the magnet 10a and the yoke 11c, providing a magnetic gap between the coil 9a and the magnetic 10a and a magnetic gap between the coil 9a and the yoke 11c. Similarly, the second tracking coil 9b between the magnet 10b and the yoke 11d, providing a magnetic gap between the coil 9b and the magnet 10b and a magnetic gap between the coil 9b and yoke 11d. The first tracking coil 100a is interposed between the yoke 11c on the one hand, and the magnets 10a and 101a on the other hand, providing a magnetic gap between the coil 100a and the yoke 11c and a magnetic gaps between the coil 100a an the magnets 10a and 101a. Also, the second tracking coil 100b is interposed between the yoke 11d on the one hand, and the magnets 10b and 101b on the other hand, providing a magnetic gap between the coil 100b and the yoke 11d and a magnetic gap between the coil 100b and the magnets 10b and 101b. Each magnetic gap has a specific length. The permanent magnets 10a and 10b apply magnetic fields to the focusing coils 9a and 9b, respectively. The permanent magnets 101a an 101b applies magnetic fields to the tracking coils 100a and 100b, respectively.

The yokes 11a to 11d are fastened to the upper surface of the second movable member 6 by means of welding or riveting. The permanent magnets 10a and 10b are magnetized along the axis of the shaft 7. The permanent magnets 101a and 101b are magnetized along a line extending at right angles to the axis of the shaft 7. The magnetic circuits 12a and 12b are identical in structure.

A current is made to flow through both focusing coils 9a and 9b, they generate a magnetic field each. The magnetic fields generated by the focusing coils 9a and 9b act on the magnetic fluxes applied from the permanent magnets 10a and 10b, respectively, generating a Lorentz's force. By virtue of Lorentz's force, the first movable member 5 is slightly moved in the axial direction of the disk 1 (that is, along the axis of the shaft 7). Meanwhile, a current is made to flow through both tracking coils 100a and 100b, they generate a magnetic field each. The magnetic fields generated by the tracking coil 100a and 100b act on the magnetic fluxes applied from the permanent magnets 10a and 10b, respectively, generating a Lorentz's force. Due to this Lorentz's force, the first movable member 5 is slightly rotated around the axis of the disk 1 (that is, around the axis of the shaft 7).

As described above, the tracking coils 100a and 100b are bonded to the outer circumferential surface of the coil bobbin 5b. A ferromagnetic member 110a is provided in the center space of the first tracking coil 100a. Similarly, a ferromagnetic member 110b is provided in the center space of the second tracking coil 100b. The ferromagnetic members 110a and 110b diametrically oppose each other with respect to the shaft 7. As long as the objective lens 8a or 8b remains in an optical path 24 (later described), the member 110a is located between the yoke 11c and permanent magnet 101a of the first magnetic circuit 12a, and member 110b is located between the yoke 11d and the permanent magnet 101b of the second magnetic circuit 12b.

As shown in FIG. 3, a sliding bearing 6a is fastened to the center of the second movable member 6 by means of ultrasonic wave welding, thermal fusion or welding. The sliding bearing is mounted on the shaft 7, with a small clearance (10 microns of less) with the circumferential surface of the shaft 7. The sliding bearing 6a allows the second movable member 6 to be rotated. Thus, the movable member 6 can rotate, independently of the first movable member 5. The movable member 6 is prevented from moving along the shaft 7 by two stoppers 32a and 32b which are secured to the upper surface of the fixed base 4a of the carriage 4.

As seen from FIG. 3, two spacer rings 102 and 103 are mounted on upon each other and interposed between the sliding bearings 5c and 6a which are provided for the first and second movable member 5 and 6, respectively. Each spacer ring is an elastic member (e.g., a coil spring) or a viscoelastic member (e.g., a ring of silicone rubber or butyl rubber). The second spacer ring 103 has a smaller friction coefficient than the first spacer ring 102. The first spacer ring 102 is secured to the sliding bearing 6a, while the second spacer ring 103 opposes the sliding bearing 5c. Preferably, the coefficient of friction between the second spacer ring 103 and the second sliding bearing 6a is 0.4 or less so that the ring 103 and the bearing 6a may not be adsorbed to each other.

Referring back to FIG. 2, a first pair of terminals 104a and 104b are mounted on the upper surface of the blade 5a and connected to the focusing coils 9a and 9b. They are also by lead lines 106a and 106b to a second pair of terminals 105a and 105b provided on the first magnetic circuit 12a. Similarly, a third pair of terminals 104c and 104d are mounted on the upper surface of the blade 5a and connected to the tracking coils 100a and 100b. The terminals 104c and 104d are also connected by lead lines 106c and 106d to a fourth pair of terminals 105c and 105d provided on the second magnetic circuit 12b. The lead wires 106a to 106d are provided to supply electric power (i.e., a current) to the focusing coils 9a and 9b and the tracking coils 100a and 100b.

The terminals 105a to 105d on the magnetic circuits 12a and 12b are connected to an external power supply (not shown) by means of a flexible printed board 107. The flexible printed board 107 is longer than half the circumference of the second movable member 6. The board 107 is bent in the shape of letter U, as is illustrated in FIG. 2.

The first movable member 5 and the second movable member 6 are mounted on the shaft 7 which protrudes upwards from the upper surface of the fixed base 4a. As shown in FIG. 1, a pair of radial coils 13a and 13b are attached to the ends of the fixed base 4a, located at the same distance from the center of gravity of the carriage 4. The radial coils 13a and 13b receive the magnetic fields generated by radial magnetic circuits 14a and 14b which are secured to the base 2. The first radial circuit 14a comprises a back yoke 15a, the center yoke 16a and a permanent magnet 17a. The second radial circuit 14b comprises a back yoke 15b, a center yoke 16b and a permanent magnet 17b. The center yoke 16a and permanent magnet 17a of the first radial circuit 14a define a magnetic gap, in which the first radial coil 13a is movably inserted. Similarly, the center yoke 16b and permanent magnet 17b of the second radial circuit 14b define a magnetic gap, in which the second radial coil 13b is movably inserted. The radial circuits 14a and 14b are identical in structure. The permanent magnets 17a and 17b are magnetized in the direction in which the center yokes 16a and 16b are spaced apart from the prepayment magnets 17a and 17b, respectively.

As seen from FIG. 2, a first pair of sliding bearings 19a are provide at the upper-right and lower-right corners of the fixed base 4a, and a second pair of sliding bearings 19b are provided at the upper-left and lower-left corners of the fixed base 4a. As can be understood from FIG. 1, the sliding bearings 19a support a first guide rail 18a, and the sliding bearings 19b a second guide rail 18b. The guide rail 18a and 18b extend parallel to each other. Each rail is fastened to the base 4 at both ends. The carriage 4 can move along the guide rails 18a and 18b.

When currents flow through the radial coils 13a and 13b which receive the magnetic fluxes emanating from the first and second magnetic circuits 14a and 14b, a Lorentz's force is generated. The Lorentz's force drives the second movable member 6 in the radial direction of the disk 1.

The magnetic gap of the radial circuit 14a is large enough to allow the second movable member 6 to move along the guide rails 18a and 18b to move the objective lenses 8a and 8b from the outermost recording track on the disk 1 to the innermost recording track thereof, or vice versa. Furthermore, both radial magnetic circuits 14a and 14b are long enough to move the carriage 4 (or the objective lenses 8a and 8b) outwards from the outermost recording track on the disk 1. When the carriage 4 is moved to a position outside the outermost recording track, the pinion 108 on an electric motor fixed to the base 2 comes into mesh with the rack 109 formed on the circumferential surface of the second movable member 6, as illustrated in FIG. 4. When the motor drives the pinion 108, the second movable member 6 is rotated through a desired angle.

The optical system and the signal-processing system, both incorporated in the optical disk drive, will be described with reference to FIG. 4.

As shown in FIG. 4, the optical disk drive has an optical unit 20 and a control section 26. The optical unit 20 is secured to the lower surface of the first movable member 4 and can be moved together with the first movable member 4. The control section 26 is electrically connected to the optical unit 20.

The optical unit 20 is designed to apply a laser beam onto the recording surface of the disk 1. It comprises a semiconductor laser 21, a collimator lens 22, two beam splitters 23a and 23b, two focusing lenses 24a and 24b, and two light detectors 25a and 25b.

The semiconductor laser 21 emits a laser beam LB. The collimator lens 22 converts the beam LB into a parallel laser beam. The first beam splitter 23a bends the parallel laser beam by 90°, applying the beam into the carriage 4 through an optical path (space) 41 made in the bottom of the carriage 4. The beam is finally supplied to the objective lens 8 (either the lens 8a or the lens 8b). The lens 8 converges the input laser beam LB to some extent. The beam thus converged is applied onto the recording surface of the disk 1.

Assume that the optical disk drive is in the data-reproducing mode. The laser beam LB reflected from the recording surface of the disk 1 modulated in intensity in accordance with the presence of pits formed in the recording surface of the disk 1. The beam LB is then supplied back to the optical unit 20 through the objective lens 8. In the unit 20, the beam LB passes through the first beam splitter 23a and is supplied to the second beam splitter 23b. The second beam splitter 23b slits the beam LB into two beams. The first beam is supplied via the first focusing lens 24a to the first light detector 25a. The second beam is supplied via the second focusing lens 24b to the second light detector 25b. The first light detector 25a generates a electric signal from the first beam. The second light detector 25b generates a second signal from the first beam. Each signal has a magnitude which is proportional to the size of the beam spot. Both signals are supplied to the control section 26.

As shown in FIG. 4, the control section 26 comprises a tracking control circuit 27, a focusing control circuit 28, a data-reproducing circuit 29, a signal generator 30, and a lens-switching circuit 31.

In the control section 26, the tracking control circuit 27 receives the first signal, and the focusing control circuit 28 receives the second signal. The tracking control circuit 27 generates a tracking offset signal from the first signal, and the focusing control circuit 28 generates a focusing offset signal from the second signal.

The tracking offset signal and the focusing offset signal are used to move the objective lens 8 in the radial and axial directions of the disk 1. Stated more precisely, from the focusing offset signal it is determined how far the focal point of the objective lens 8 is deviated from the recording surface of the disk 1, and from the tracking offset signal it is determined how far the laser beam is deviated from any desired track on the disk 1. The current supplied to the focusing coils 9a and 9b is changed to eliminate the deviation of the focal point from the recording surface of the disk 1, and the current supplied to the tracking coils 100a and 100b is changed to eliminate the deviation of the beam from the desired track.

The second signal generated by the second light detector 25b is supplied to the data-reproducing circuit 29. Generated from the laser beam LB reflected from the recording surface of the disk 1, the second signal represents various kinds of data items recorded on the disk 1. The circuit 29 processes the second signal into various types of data items, which are supplied to a host system (not shown), such as a personal computer. The display of the host system displays a still picture, a moving picture, and the speaker of the host system generate music and/or speech. The carriage 4 is moved minutely or greatly along the radius of the disk 1 so that the axis of the objective lens 8 moves to the desired track on the disk 1.

The signal generator 30 and the lens-switching circuit 31 receive the data supplied from the host system. From the data the signal generator 30 generates a signal, which is supplied to the semiconductor laser 21. From the data the lens-switching circuit 31 generates a control signal, which is supplied to the electric motor to which the pinion 108 is connected. Controlled by the control signal, the motor drives the pinion 108. The second movable member 6 is thereby rotated until either the objective lens 8a or the objective lens 8b moves into the optical path 24 of the optical unit 20.

How the objective lens is switched from the lens 8a to the lens 8b, or vice versa, will be explained.

The optical disk drive can record data on or reproduce data from various kinds of disks, unlike the conventional disk drive in which only one kind of a disk can be used. The disks may differ in characteristics, such as thickness, recording density, warping tolerance and the like. The first objective lens 8a is designed to record data on or reproduce data from a disk of one type, and the second objective lens 8b to record data on or reproduce data from a disk of another type.

The disk 1 may be of the type to which a laser beam LB of a smaller diameter needs to be applied to record data on or reproduce data from the disk 1. In this case, the objective lens 8a or 8b having a greater number of aperture (NA) than the other is selected and used. Conversely, when the disk 1 is of the type to which a laser beam LB of a smaller diameter must be applied to record or reproduce data, the other objective lens that has a smaller number of aperture (NA) is selected and used.

To select either the first objective lens 8a or the second objective lens 8b, the user of the optical disk drive operates the host system (e.g., a personal computer), inputting data representing the type of the disk 1 (e.g., a CD-ROM disk, a PC disk, or the like), after he or she has connected the disk 1 to the turntable connected to the spindle motor 3 by means of the chucking means. The data is supplied to the lens-switching circuit 31, which generates a control signal. The control signal is supplied to the electric motor, driving the same. The motor in turn drives the pinion 108, rotating the second movable member 6 until the objective lens (8a or 8b) designated by the data is moved into the optical path 41.

The operation of the first embodiment described above will now be explained.

First, either the first objective lens 8a or the second objective lens 8b is selected by controlling the magnetic circuits 12a and 12b mounted on the second movable member 6. More specifically, in accordance with a signal supplied from the lens-switching circuit 31, the carriage 4 is moved to a position outside the outermost track on the disk 1 as shown in FIG. 1. The rack 109 formed on the circumferential surface of the second movable member 6 is thereby set into mesh with the pinion 108 on the electric motor which is fixed to the base 2. Then, the electric motor is driven, rotating the pinion 108. The second movable member 6 is rotated, whereby both magnetic circuits 12a and 12b are rotated.

As described above, the ferromagnetic members 110a and 110b are bonded to the first movable member 5. When the ferromagnetic members 110a and 110b are located respectively between the yoke 11d and permanent magnet 101a of the first magnetic circuit 12b and between the yoke 11d and the permanent magnet 191b of the second magnetic circuit 12b, the attraction which second movable member 6 applies to the first movable member 5 increases to a maximum. In other words, the first movable member 5 is magnetically fastened to the second movable member 6. As a result, the first movable member 5 is rotated by 180° when the second movable member 6 is rotated by the same angle. The objective lens is thereby switched, from the lens 8a to the lens 8b or vice versa.

Needless to say, it is unnecessary to rotate the second movable member 6 and, ultimately, the first movable member 5, if the desired objective lens is located in the optical path 41.

As indicated above, the objective lens 8a or 8b is selected and used in accordance with the standards and characteristics of the disk 1 connected to the spindle motor 3. One lens-driving unit suffices to record data on or reproduce data from two types of optical or optomagnetic disks. Thus, the optical disk drive need not be provided with a plurality of lens-driving units.

Moreover, as mentioned above, the shaft 7 is secured to the fixed base 4a of the carriage 4, the angle at which the blade 5a is inclined to the shaft 7 remains unchanged, and both objective lenses 8a and 8b have been so positioned that each has its optical axis aligned with the optical path 24 of the optical unit 20 when it is moved to the position where it performs its function. Therefore, whichever object lens, 8a or 8b, is selected and used, the optical disk drive can record data on or reproduce data from an optical or optomagnetic disk, without causing coma-aberration or the like.

The distance between the first movable member 5 and each of the magnetic circuits 12a and 12b provided on the second movable member 6 changes by very little when the first movable member 5 is minutely rotated through only a few degrees. Further, the distance remains unchanged when the second movable member 6 is rotated by 180°, thereby rotating the first movable member 5 by the same angle, to switch between the first objective lenses 8a and the second objective lens 8b. Hence, the lead wires 106a to 106d connecting the magnetic circuits 12a and 12b to the first movable member 5 are scarcely pulled. Virtually there is no risk that the lead wires 106a to 106d are cut.

Second Embodiment

Another optical disk drive, which is a data recording device or a data reproducing device according to the second embodiment of the present invention, will be described with reference to FIG. 5. The components similar or identical to those of the first embodiment are denoted at the same reference numerals in FIG. 5 and will not be described in detail.

The second embodiment (FIG. 5) differs from the first embodiment (FIG. 1) in the mechanism for switching between the first objective lens 8a and the second objective lens 8b. More precisely, two projections 121 and 122 and two levers 123 and 124 are utilized, whereas the pinion 108 and the motor for rotating the pinion 108 are employed in the first embodiment.

Both projections 121 and 122 protrude upwards from the second movable member 6, and both levers 123 and 124 are secured to the base 2. To rotate the magnetic circuits 12a and 12b in one direction, the first projection 121 is made to abut on the first lever 123 as the carriage 4 is moved to a position outside the outermost track of the disk 1. To rotate the magnetic circuits 12a and 12b in the opposite direction, the second projection 122 is made to abut on the second lever 124. Thus, the angle through which to rotate the magnetic circuits 12a and 12b can be changed to any desired value in accordance with the distance the carriage 4 is moved in the radial direction of the disk 1.

The first lever 123 may be used as a spring for rotating the magnetic circuits 12a and 12b. Once the circuits 12a and 12b have been rotated through, for example, first 90°, they are then automatically rotated through the remaining 90° by the spring force of the first lever 123 which abuts on the first projection 121. In this case, the second lever 124 is moved in the direction of arrow A to a standby position and held at the standby position by means of a cam (not shown), so as not to collide with the first projection 121.

As can be understood from the above, the second embodiment achieves the same advantages as the first embodiment. In addition, its manufacturing cost is lower than that of the first embodiment since no electric motor (i.e., an expensive component) is used to rotate the magnetic circuits 12a and 12b.

Third Embodiment

Still another optical disk drive, which is a data recording device or a data reproducing device according to the third embodiment of the present invention, will be described with reference to FIGS. 6, 7 and 8. The components similar or identical to those of the first embodiment are designated at the same reference numerals in FIGS. 6, 7 and 8 and will not be described in detail.

The third embodiment (FIG. 6) differs from the second embodiment (FIG. 5) in the mechanism for switching between the first objective lens 8a and the second objective lens 8b. Put more specifically, an intermediate gear 131, a driving gear 132 and an electric motor for rotating the gear 132 are used, whereas the projections 121 and 122 and the levers 123 and 124 are used in the second embodiment.

Figure 6:
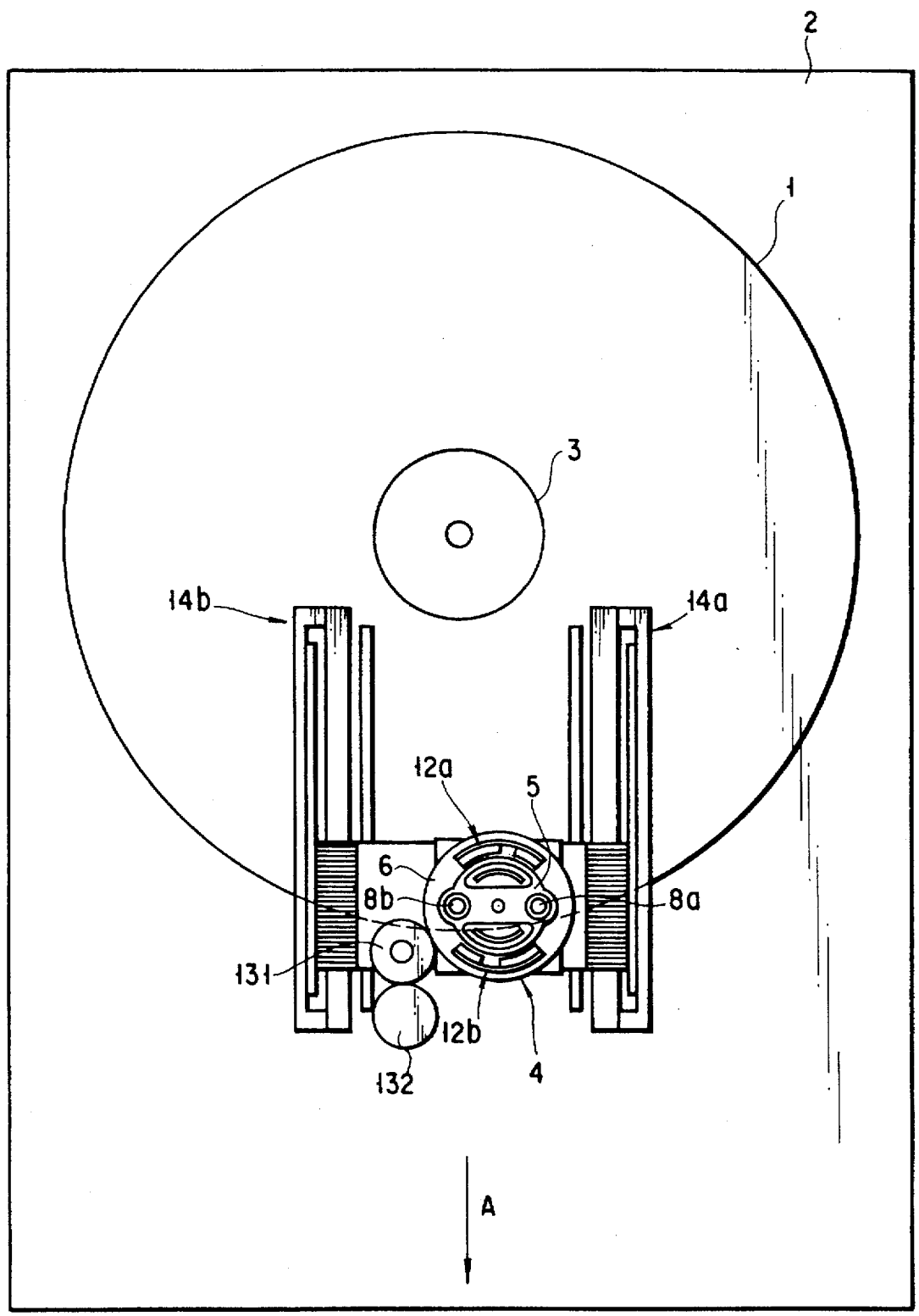
FIG. 6 is a plan view of an optical disk drive which is a third embodiment of the present invention.

As shown in FIG. 6, the intermediate gear 131 is mounted on the carriage 4 and set in mesh with the rack (not shown) formed on the circumferential surface of the second movable member 6. The electric motor (not shown) is secured to the base 2. As seen from FIG. 7, the driving gear 132 is connected to the shaft of the electric motor. The driving gear 132 can be set into engagement with the intermediate gear 131 mounted on the carriage 4. Thus, when the motor is driven, the driving gear 132 rotates the intermediate gear 131, provided that it is set in engagement with the intermediate gear 131. The second movable member 6 can then be rotated by a desired angle.

As shown in FIGS. 7 and 8, the second movable member 6 has an arcuate groove 133 in the lower surface. As illustrated in FIG. 7, a stopper pin 134 protrudes upwards from the base 2, extends through a hole made in the fixed base 4a of the carriage 4, and fits into the arcuate groove 133 of the second movable member 6. The stopper pin 134 is located on a line connecting the axis of the shaft 7 and that of the intermediate gear 131.

As seen from FIG. 8 which is a plan view of the second movable member 6, the groove 133 extends half around the axis of the movable member 6. When the stopper pin 134 abuts on either end of the groove 133, the member 6 cannot be rotated further at all. Hence, the second movable member 6 cannot be rotated through an angler greater than 180°.

The following sequence of steps is carried out to rotate the magnetic circuits 12a and 12b which are mounted on the second movable member 6. At first, the carriage 4 is moved to a position outside the outermost track on the disk 1 as shown in FIG. 6, putting the intermediate gear 131 provided on the carriage 4 into mesh with the driving gear 132 connected to the motor which is secured to the base 2. Then, the motor is driven, rotating the driving gear 132. The intermediate gear 131 is thereby rotated, rotating the second movable member 6. As a result, both magnetic circuits 12a and 12b are rotated through 180°, until the stopper pin 134 abuts on either end of the groove 133 made in the second movable member 6. The first movable member 5 is therefore rotated, whereby the objective lens is thereby switched, from the first lens 8a to the second lens 8b or vice versa.

Since a driving force is transmitted from the driving gear 132 to the second movable member 6 through the intermediate gear 131, the driving gear 132 would not push the second movable member 6 to incline the shaft 7. Thus, the third embodiment can not only attain the same advantages as the first embodiment, but also prevent the shaft 7 from inclining to deteriorate the signals reproduced from the disk 1.

Fourth Embodiment

A further optical disk drive, which is a data recording device or a data reproducing device according to the fourth embodiment of the present invention, will be described with reference to FIG. 9. The components similar or identical to those of the first embodiment are denoted at the same reference numerals in FIG. 9 and will not be described in detail.

The fourth embodiment (FIG. 9) differs from the second embodiment (FIG. 5) in the mechanism for rotating the intermediate gear 131 to switch between the first objective lens 8a and the second objective lens 8b. To be more specific, a rack 234 is utilized in place of the driving gear 132 and the electric motor, in order to rotate the intermediate gear 131.

Figure 9:
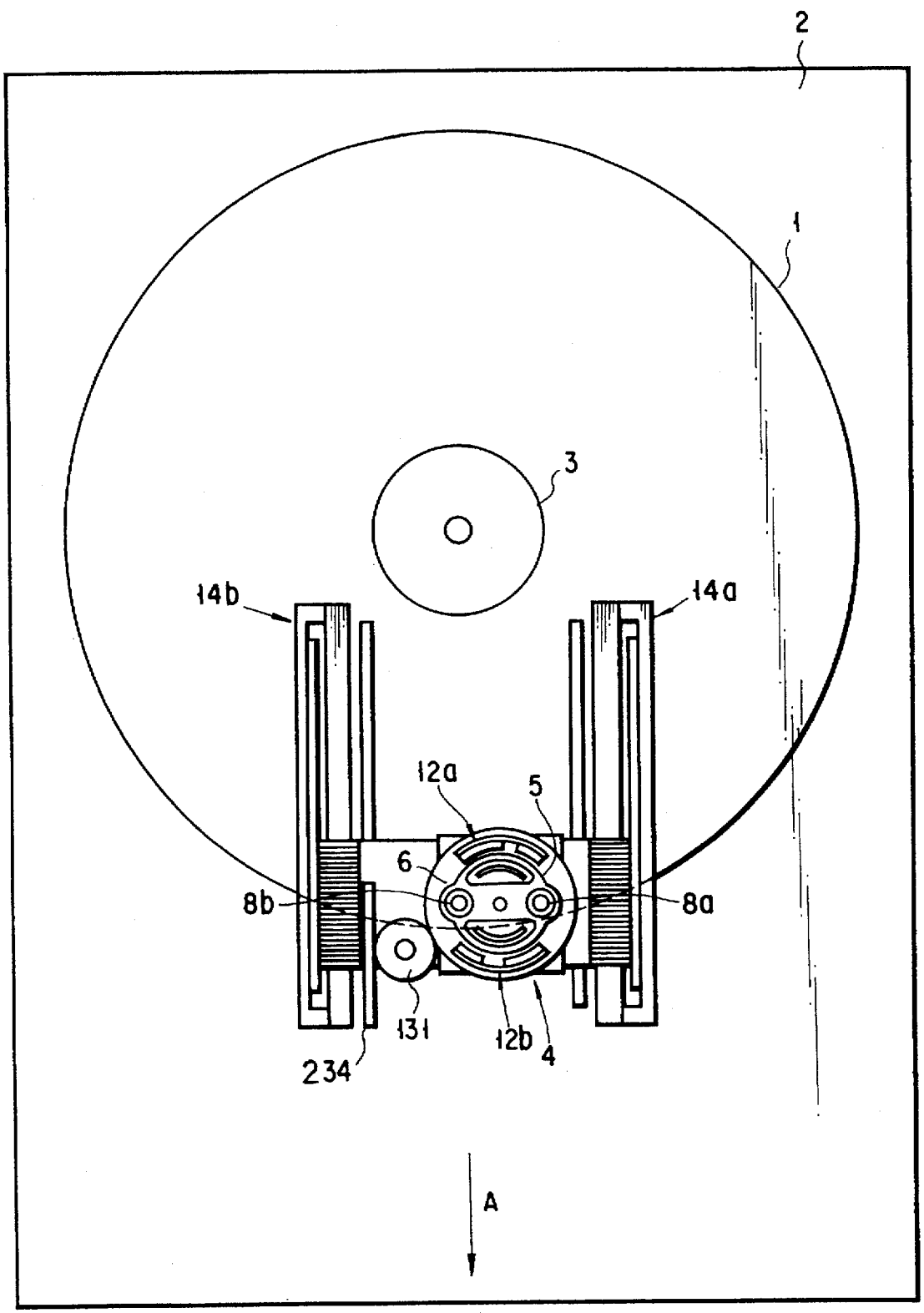
FIG. 9 is a plan view of an optical disk drive which is a fourth embodiment of the present invention.

As shown in FIG. 9, the rack 234 is secured to the base 2. As the carriage 4 is moved to a position outside the outermost track on the disk 1, the intermediate gear 131 on the carriage 4 is set into mesh with the rack 234 on the base 2, whereby the intermediate gear 131 is rotated. The gear 131 rotates the second movable member 6 because it is set in engagement with the rack (not shown) formed on the circumferential surface of the second movable member 6. The magnetic circuits 12a and 12b mounted on the second movable member 6 are thereby rotated, rotating the first movable member 5. The objective lens is therefore switched, from the first lens 8a to the second lens 8b or vice versa. To rotate the magnetic circuits 12a and 12b back to their respective initial positions, it suffices to move the carriage 4 toward the innermost track on the disk 1 from that position outside the outermost track on the disk 1. Therefore, it is possible to rotate the magnetic circuits 12a and 12b through any desired angle by moving the carriage 4 for a specific distance in the radial direction of the disk 1.

Like the second embodiment, the fourth embodiment can not only achieve the same advantages as the first embodiment, but also be manufactured at a lower cost since no electric motor (i.e., an expensive component) is used to rotate the magnetic circuits 12a and 12b.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

For instance, the magnetic circuits 12a and 12b need not be rotated in entirety when the second movable member 6 is rotated. Rather, it suffices to rotate only the yoke 11c on the first magnetic circuit 12a and the yoke 11d on the second magnetic circuit 12b. When the yokes 11c and 11d are rotated, the yoke 11a and 11b are also rotated since they are magnetically attracted to the yokes 11c and 11d, respectively. As a result, the first movable member 5 is rotated. In this case, it is preferable that the yokes 11a and 11b are arranged rotatable around the shaft 7.

Furthermore, the flexible printed board 107 may be replaced by lead wires in each embodiment described above.

The present invention can be applied not only to an optical disk drive equipped which has a plurality of objective lenses, but also to a magnetic disk drive which has a plurality of magnetic heads mounted on a disc-shaped member equivalent to the first movable member 5.

Furthermore, regarding each of the third and fourth embodiments, it is possible to rotate the magnetic circuits 12a and 12b by utilizing driving power of the spindle motor 3 when the carriage 4 is moved to a position outside the outermost track on the disk 1. In this case, it is need to implement a mechanism such that rotating power of the spindle motor 3 may be delivered to the magnetic circuits 12a and 12b by setting the spindle motor 3 into mesh with the second movable member 6 and the spindle motor 3 may rotate through 180°, for example.

As has been described in detail, the optical disk drive which is a data recording device or a data reproducing device according to the present invention has a plurality of objective lens (or heads), one of which can be selected in accordance with the type of the data recording medium (e.g., an optical disk or an optomagnetic disk). Hence, the device can record data on or reproduce data from not only a conventional disk but also a new-standard disk. In other words, it can record data on or reproduce data from two or more optical or optomagnetic disks of different standards or characteristics.

The present invention is characterized in that a magnet (a part of a magnetic circuit) is attached to the second movable member, to rotate the first movable member holding the objective lenses and can be rotated around its axis. The angle at which the second movable member is inclined to the shaft therefore remains unchanged. The objective lenses have been so positioned that each has its optical axis aligned with a reference optical when it is moved to the specific position where it is used. Thus, whichever object lens is used, the device can record data on or reproduce data from a disk, without causing coma-aberration or the like.

Since the distance between the first and second movable members remains unchanged even if the second movable member rotates, there is no risk that the lead wires are cut while the device is recording data on or reproducing data from a disk, provided that the lead wires extend from the first movable member, are held to the second movable member and are led outside the device.

What is claimed is:

1. An objective lens driving device comprising:
   a carriage movable along an optical data recording medium;
   a shaft mounted on said carriage;
   a first movable member rotatable around said shaft;
   a plurality of objective lenses mounted on said first movable member and having different optical characteristics;
   a second movable member rotatable around said shaft magnetically fastening said first movable member thereto and rotatable with said first movable member; and
   a driver which rotates and positions said first and second movable members to selectively rotate and position one of the plurality of objective lenses such that a light beam is applied to the optical data recording medium through a desired one of said objective lenses.

2. The device according to claim 1, further comprising a ferromagnetic member attached to said first movable member, and a magnet attached to said second movable member, for attracting said first movable member.

3. The device according to claim 1, further comprising a coil mounted on said first movable member, for receiving an electric current to rotate said first movable member.

4. The device according to claim 3, further comprising a lead wire extending from said first movable member, held to said second movable member and led outside the device, for supplying an electric current to said coil.

5. The device according to claim 1, wherein said first movable member has a center of gravity which is located on an axis of said shaft.

6. The device according to claim 1, wherein said plurality of objective lenses have different numbers of apertures.

7. The device according to claim 1, wherein said carriage is moveable to a position outside the optical data recording medium.

8. The device according to claim 7, wherein said driver comprises a driving gear which comes into mesh with said second movable member when said carriage is moved to the position outside the optical data recording medium, and an electric motor for rotating the driving gear.

9. The device according to claim 7, wherein said driver has a lever which abuts on said second movable member to rotate said second movable member as said carriage is moved to the position outside the optical data recording medium.

10. The device according to claim 7, wherein said carriage has an intermediate gear set in mesh with said second movable member.

11. The device according to claim 10, wherein said driver comprises a driving gear which comes into mesh with said intermediate gear when said carriage is moved to the position outside the optical data recording medium, and an electric motor for rotating the driving gear.

12. The device according to claim 10, wherein said driver has a lever which abuts on said second movable member to rotate said intermediate gear as said carriage is moved to the position outside the optical data recording medium.

13. A data recording device comprising:
   a carriage movable along an optical data recording medium;
   a shaft mounted on said carriage;
   a first movable member rotatable around said shaft;
   a plurality of objective lenses mounted on said first movable member and having different optical characteristics;
   a second movable member rotatable around said shaft magnetically fastening said first movable member thereto and rotatable with said first movable member; and a driver for which rotates and positions said first and second movable members to selectively rotate and position one of the plurality of objective lenses such that data is recorded on the optical data recording medium by a desired one of said objective lenses.

14. The device according to claim 13, further comprising a ferromagnetic member attached to said first movable member, and a magnet attached to said second movable member, for attracting said first movable member.

15. The device according to claim 13, further comprising a coil mounted on said first movable member, for receiving an electric current to rotate said first movable member.

16. The device according to claim 15, further comprising a lead wire extending from said first movable member, held to said second movable member and led outside the device, for supplying an electric current to said coil.

17. The device according to claim 13, wherein said first movable member has a center of gravity which is located on an axis of said shaft.

18. The device according to claim 13, wherein said carriage is moveable to a position outside the optical data recording medium.

19. The device according to claim 18, wherein said driver comprises a driving gear which comes into mesh with said second movable member when said carriage is moved to the position outside the optical data recording medium, and an electric motor for rotating the driving gear.

20. The device according to claim 18, wherein said driver has a lever which abuts on said second movable member to rotate said second movable member as said carriage is moved to the position outside the optical data recording medium.

21. The device according to claim 18, wherein said carriage has an intermediate gear set in mesh with said second movable member.

22. The device according to claim 21, wherein said driver comprises a driving gear which comes into mesh with said intermediate gear when said carriage is moved to the position outside the optical data recording medium, and an electric motor for rotating the driving gear.

23. The device according to claim 21, wherein said driver has a lever which abuts on said second movable member to rotate said intermediate gear as said carriage is moved to the position outside the optical data recording medium.

24. A data reproducing device comprising:

a carriage movable along an optical data recording medium;

a shaft mounted on said carriage;

a first movable member rotatable around said shaft;

a plurality of objective lenses mounted on said first movable member and having different optical characteristics;

a second movable member rotatable around said shaft magnetically fastening said first movable member thereto and rotatable with said first movable member; and a driver which rotates and positions said first and second movable members to selectively rotate and position one of the plurality of objective lenses such that data is reproduced from the optical data recording medium by a desired one of said objective lenses.

25. The device according to claim 24, further comprising a ferromagnetic member attached to said first movable member, and a magnet attached to said second movable member, for attracting said first movable member.

26. The device according to claim 24, further comprising a coil mounted on said first movable member, for receiving an electric current to rotate said first movable member.

27. The device according to claim 26, further comprising a lead wire extending from said first movable member, held to said second movable member and led outside the device, for supplying an electric current to said coil.

28. The device according to claim 24, wherein said first movable member has a center of gravity which is located on an axis of said shaft.

29. The device according to claim 24, wherein said carriage is moveable to a position outside the optical data recording medium.

30. The device according to claim 29, wherein said driver comprises a driving gear which comes into mesh with said second movable member when said carriage is moved to the position outside the optical data recording medium, and an electric motor for rotating the driving gear.

31. The device according to claim 29, wherein said driver has a lever which abuts on said second movable member to rotate said second movable member as said carriage is moved to the position outside the optical data recording medium.

32. The device according to claim 29, wherein said carriage has an intermediate gear set in mesh with said second movable member.

33. The device according to claim 32, wherein said driver comprises a driving gear which comes into mesh with said intermediate gear when said carriage is moved to the position outside the optical data recording medium, and an electric motor for rotating the driving gear.

34. The device according to claim 32, wherein said driver has a lever which abuts on said second movable member to rotate said intermediate gear as said carriage is moved to the position outside the optical data recording medium.

* * * * *

UNITED STATES PATENT AND TRADEMARK OFFICE
CERTIFICATE OF CORRECTION

PATENT NO. : 5,721,723
DATED : February 24, 1998
INVENTOR(S) : Kiyotaka UCHIMARU et al.

It is certified that error appears in the above-identified patent and that said Letters Patent is hereby corrected as shown below:

On the title page, Item [54], and the top of column 1:

...120 Tutine.. should read --ROTATING--

Signed and Sealed this

Twenty-eighth Day of April, 1998

Attest:

BRUCE LEHMAN

Attesting Officer

Commissioner of Patents and Trademarks